June 30, 1953     C. A. ENGLISH     2,643,486
APPARATUS FOR FORMING A RIBBON OF GLASS
Filed Dec. 31, 1949
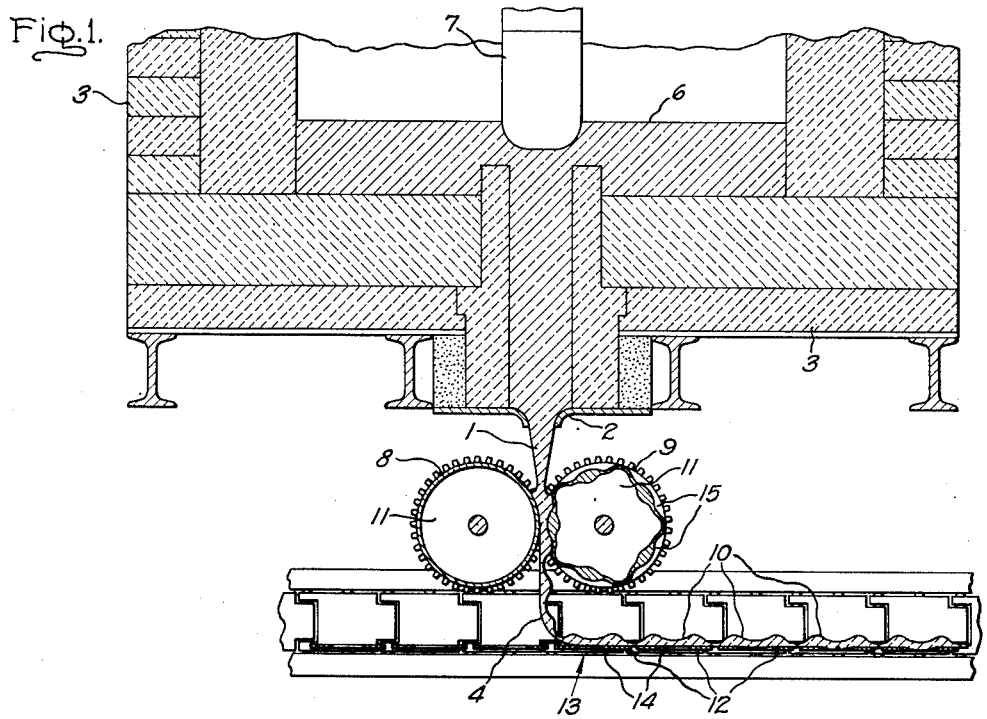
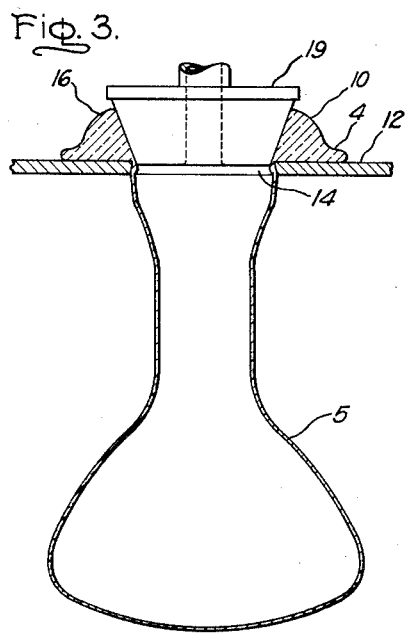
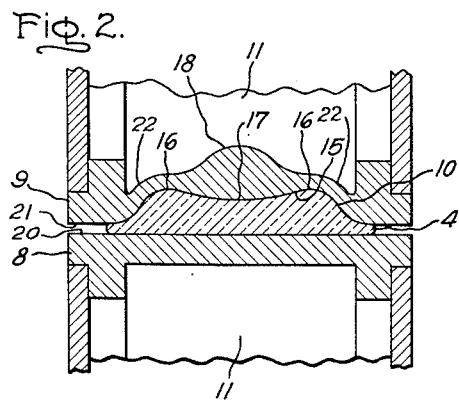
Inventor:
Chester A. English,
by Vernet C. Kauffman
His Attorney.

Patented June 30, 1953

2,643,486

UNITED STATES PATENT OFFICE 2,643,486

APPARATUS FOR FORMING A RIBBON OF GLASS

Chester A. English, Niles, Ohio, assignor to General Electric Company, a corporation of New York Application December 31, 1949, Serial No. 136,328

1 Claim. (Cl. 49—33)

My invention relates to apparatus for blowing lamp bulbs and the like. More particularly, my invention relates to a roll construction for the making of a ribbon of molten glass with bosses therealong of a shape to effect a desired distribution of glass in the articles blown therefrom.

Articles have heretofore been blown from concentrations of glass in a ribbon formed by passage of a glass stream between cooperating peripheries of rotated feed rolls as disclosed in United States Patent 1,790,397—Woods et al. This prior practice has not, however, been interested particularly with the effect of the shape of the concentrations in the ribbon with regard to the distribution of glass in the articles blown therefrom and, in most instances, shaped said concentrations in the form of round bosses of uniform thickness. Subsequently occurring operations of the bulb blowing machine were depended upon to control the distribution of glass and consequent wall thickness of the articles.

An object of my invention is to control the distribution of glass and consequently the wall thickness of articles blown from a ribbon of molten glass by forming bosses along the ribbon of a shape to assist in the development of articles of the desired character. The invention is particularly useful in the manufacture of the so-called larger sizes of articles usually five inches or more in diameter which are manufactured at slower rates of speed than in usual practice.

Another object of my invention is to form round bosses along a ribbon of molten glass for the development of blown articles, which bosses have less thickness at the center than at the surrounding edge portion. The boss is, according to the invention, shaped so that the side of the article being blown therefrom is developed from the thickest portion of the boss and so that the end of said article is developed from the thin center portion thereof. The edge of the boss is excessively chilled in the process and is not used. In the blowing of reflector type lamp bulbs five inches in diameter and seven inches long, the prescribed boss causes a bulb to be produced having a thinner and more uniform end portion and having thicker and more uniform sides.

Still other advantages and features of my invention will appear in the following detailed description and in the accompanying drawing.

In the drawing, Fig. 1 is a vertical section through the discharge orifice of the forehearth of a glass furnace and the feed rolls and the ribbon conveyor of a bulb blowing machine; Fig. 2 is a transverse section on a larger scale through peripheral portions of the feed rolls comprising one of the pockets in one roll and the cooperating periphery of the second roll; and Fig. 3 is a transverse section through the center of a boss of the ribbon, and the conveyor support plate and blowhead of the blowing apparatus at the moment of completion of a bulb.

According to the invention, a stream 1 of glass in a heated and workable condition and issuing from an orifice 2 in the bottom of a forehearth 3 is transformed into a ribbon 4 of suitable proportions to enable bulbs 5 or the like to be blown therefrom. The glass is drawn from a pool 6 within the forehearth 3 under the control of the needle 7 and takes the natural form of the stream 1 until said stream 1 is intercepted by the closely spaced feed rolls 8 and 9 and is reshaped in passing therebetween. The pressure of engagement of the feed rolls 8 and 9 spreads the stream 1 into a relatively thin continuous ribbon 4 having concentrations of glass in the form of bosses 10 at regularly spaced intervals therealong. The rolls 8 and 9 are cooled by the circulation of water throughout their hollow interiors 11 in the manner of the feed rolls shown in the United States Patent 1,790,397, Woods et al. hereinbefore referred to and chill the glass ribbon sufficiently to cause it to retain its shape in the immediate course of travel which carries it downward onto the plates 12 of the moving conveyor 13 of the bulb blowing apparatus. The particular function of the feed rolls 8 and 9 is to form specifically shaped bosses 10 or concentrations of glass at spaced intervals along the ribbon 4 which bosses 10 take positions over the openings 14 in the conveyor plates 12 where they are allowed to sag and finally are blown into bulbs 5 of the character desired.

The rate of flow of the glass stream 1 and the rates of formation and use of the ribbon 4 are so proportioned as to cause an uninterrupted movement in the glass. The volume of flowing glass is also such as to provide sufficient glass to be present to develop the bosses 10 and, accordingly, fill the pockets 15 in the feed roll 9. The flattening effect of the feed rolls 8 and 9, which are turned oppositely at corresponding rates of speed, develops a flat surface on the side of the ribbon 4 which is to rest on the conveyor 13 inasmuch as the peripheral face 20 of roll 8 is plane and develops bosses 10 on the otherwise flat surface of the opposite side of said ribbon 4 inasmuch as the peripheral face 21 of roll 9 in this case contains a series of five equidistantly spaced pockets 15. Each pocket 15 is symmetrical and is shaped to form bosses 10 having the greater thickness in a ridge 16 adjacent the edge thereof and having less thickness in the center portion 17 so that a particular distribution of glass is produced therein in turn in the bulb blown therefrom. To compensate for the less heat capacity of the thinner portion 17 of the boss 10 and prevent nonuniform cooling thereof, it is preferred that the peripheral face 21 of roll 9 have greater wall thickness or mass at the center 18 of each pocket 15, as provided by the double convex form of the said center portion 18 in contrast with the wall portion 22 of substantially uniform thickness at the periphery of each pocket 15, so that said mass retains a greater amount of heat and will, therefore, cool this portion of said boss 10 less than the thicker edge portion 16.

As shown in Figs. 1 and 3, the thicker edges 16 of the bosses 10 take positions almost directly over the round openings 14 in the plates 12 of the conveyor 13 and the center thinner portions are free to sag down through said openings 14 and to be developed into the bulbs 5. Subsequently occurring operations corresponding to the usual course of operations of the bulb blowing apparatus which is disclosed in detail in United States Patent 1,790,397 effect the blowing and molding of the bulb 5. In that course of operation, a blow head 19 is moved against the boss 10 as shown in Fig. 3 and by pressure of engagement almost completely severs the boss 10, the center portion 17 of concave form being blown through opening 14 and into the bulb 5 and the edge portion 16 being blocked from the opening 14 by the blow head 19.

What I claim as new and desire to secure by Letters Patent of the United States is:

In glass working apparatus of the character described, a pair of spaced ribbon-forming feed rolls with cooperating peripheral faces, at least one roll being hollow and having pockets therein defined by the wall of its peripheral face, said wall being of substantially uniform thickness at the periphery of each said pocket and having a thickened center portion of double convex form so that each said pocket is of reduced depth at the center and dissipation of heat therefrom is minimized.

CHESTER A. ENGLISH.

References Cited in the file of this patent

UNITED STATES PATENTS

| Number | Name | Date |
|---|---|---|
| 259,203 | Picard | June 6, 1882 |
| 1,771,954 | Craig | July 29, 1930 |
| 1,790,397 | Woods et al. | Jan. 27, 1931 |
| 1,807,566 | Canfield | May 26, 1931 |
| 1,863,915 | Waugh, Jr. | June 21, 1932 |